Oct. 10, 1961      J. E. PATTISON      3,003,254
STABILITY DEMONSTRATOR
Filed Dec. 3, 1958      2 Sheets-Sheet 1
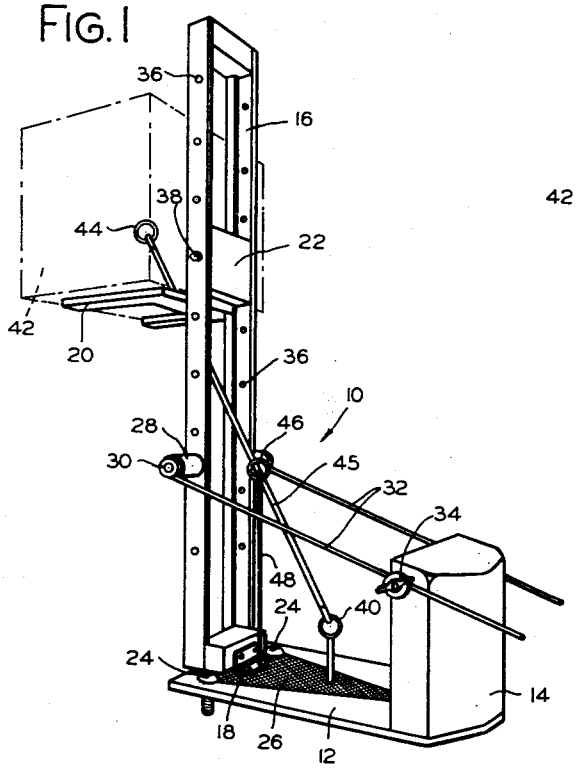
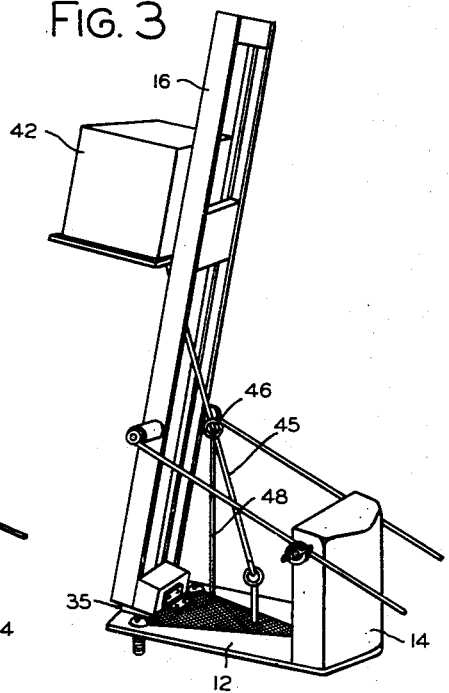
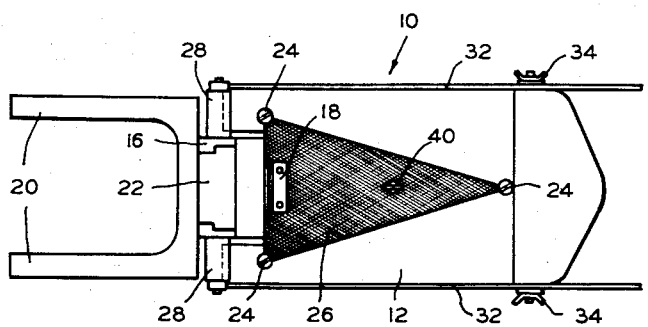
INVENTOR.
JACK E. PATTISON
BY
ATTY.

Oct. 10, 1961  J. E. PATTISON  3,003,254
STABILITY DEMONSTRATOR

Filed Dec. 3, 1958  2 Sheets-Sheet 2

INVENTOR.
JACK E. PATTISON
BY
*J.C. Wiessler*
ATTY.

United States Patent Office 3,003,254
Patented Oct. 10, 1961

3,003,254
STABILITY DEMONSTRATOR
Jack E. Pattison, Battle Creek, Mich., assignor to Clark
Equipment Company, a corporation of Michigan
Filed Dec. 3, 1958, Ser. No. 778,019
9 Claims. (Cl. 35—19)

This invention relates to a stability demonstrator device and particularly to a lift truck model construction by means of which all variable factors which influence stability are readily demonstrable.

Lift trucks have, over the years, proven to be an invaluable tool throughout industry in materials handling operations of almost limitless variety. Although manufacturers of such equipment have more or less continuously stressed the importance of using qualified operators who are fully cognizant of the safety factors involved in the use of such vehicles, accidents have occurred from time to time. A common cause of such accidents is the failure of some drivers to operate the vehicle within its stability limitations.

A brief review of the more important factors which affects the stability of a lift truck is in order.

Essentially, overall lift truck stability is divisible into longitudinal and lateral stability. Fixed factors which affect longitudinal stability are wheel base and weight distribution of the vehicle. Variable, and controllable, factors which affect longitudinal stability are the weight and distribution of weight on the forks, the elevation of the load on the forks, and the degree of forward or rearward tilt of the upright. If the truck is traveling up or down a slope, this will also affect longitudinal stability. Increasing the load, the distance of the center of gravity of the load from the front axle, the load elevation on the upright, the forward tilt of the upright, and/or the slope down which a lift truck travels will all effect, to a greater or lesser degree, a decrease in longitudinal stability.

Fixed factors which affect lateral stability are the tread of the wheels and weight distribution of the vehicle. Variable, and controllable, factors which affect lateral stability are load elevation, load distribution on the forks, the degree and direction of tilt of the upright, and/or the slope across which a truck may be traveling. As to the variable factors, back tilt of the upright, for example, will effect a decrease in the lateral stability of vehicles of a certain design while increasing the longitudinal stability, and forward tilt of the upright will have an opposite effect. Again, increasing the elevation of any given load on the upright with the upright in a vertical or non-tilted position, for example, will effect a decrease in both lateral and longitudinal stability.

Having given any set of values of the variable factors in a machine of a particular design, the resultant stability of the vehicle, both lateral and longitudinal, can be calculated. However, in the actual use of lift trucks, operators sometimes overload, overlift, and/or overtilt a load, for instance, without considering the possible damage or injury to the vehicle or to the operator.

I have devised an extremely novel construction of utmost simplicity by means of which the degree of stability of a given lift truck construction can be instantly perceived under all of the various combinations of variable factors which affect stability.

As is well known, lift truck stability may be considered, in its essence, as a particular relation between the mass center of gravity of the unloaded truck and the mass center of gravity of a load carried by the forks of a truck. In simplest terms, my invention is applicable to lift trucks by utilizing an elastic connecting means between the aforementioned centers of gravity. The location of the combined aforementioned mass centers of gravity is suitably marked on the elastic connection. This location is found to be at a position where the distances from the marked location to the respective centers of gravity are inversely proportional to the weights assumed to be concentrated at the centers of gravity. The base of the demonstrator may be marked off to identify an area of vehicle stability. Depending upon whether the marked location is within or without the vertically projected stability area will determine whether a truck under similar conditions of operation would be in a relatively stable or unstable condition.

My demonstrator unit has proven to be an extremely valuable educational and safety aid and graphically illustrates the particular effect which any given change in one or more of the aforementioned variable conditions will have upon lateral and/or longitudinal stability.

It is the primary object of this invention to provide a device by means of which variations in stability of machines and the like can be readily visualized.

Another object of the invention is to provide a relatively simple, inexpensive device for promoting greater safety in and understanding of the proper use and operation of lift trucks.

Other objects and advantages of this invention will be readily perceived by persons skilled in the art in view of the detailed description which follows.

In the drawings:

FIGURE 1 illustrates in perspective my demonstrator unit wherein the upright and load are located in a first exemplary position;

FIGURE 2 shows a plan view of the invention;

FIGURE 3 is the same as FIGURE 1 except that the upright is tilted rearwardly;

Figure 4:
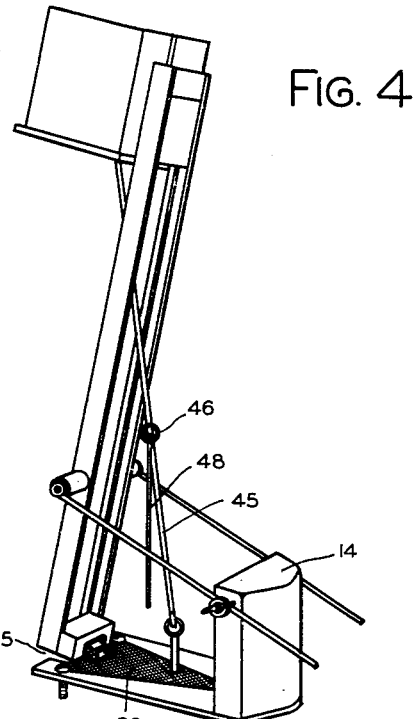
FIGURE 4 is the same as FIGURE 3 except that the load is located at the top of the upright.

Referring now in detail to the drawings, one embodiment of the demonstrator unit is shown at numeral 10 and comprises generally a base plate 12, an illustrative counterweight portion 14 secured at one end of the base plate, an upright 16 adapted for forward and rearward pivotal movement relative to base plate 12 on a hinge member 18, lifting forks 20 connected to a slide 22 in the upright 16, and three studs 24 which extend through the base plate 12 to provide points of support for the model. The model as illustrated is accurately scaled from a commercial industrial truck insofar as wheel base and weight distribution are concerned. In other words, the fixed factors which affect stability are accurately duplicated in the model.

It will be noted that a shaded isosceles triangle 26 is formed between the supports 24. The front pair of support studs 24 are accurately located in the model to proportionately duplicate the tread of the drive wheels of an actual vehicle, whereas the rearwardly located stud 24 provides support at a location in the model which is comparable to the position of articulation of the steer axle of a lift truck which utilizes three-point support, for example. Preferably, the points of support are joined by lines to form a triangle which is shaded in order to clearly define that area within the vertical projection of which the combined center of gravity of the concentrated weights of the truck and load should be located for stable operation.

Extending outwardly of opposite sides of the upright 16 is a pair of studs and sleeves 28 which secure the eyes 30 of a pair of adjustment bars 32 to the upright. The adjustment bars 32 extend rearwardly through lock nuts 34 on opposite sides of counterweight 14. The bars 32 may be marked to indicate the degree of forward or rearward tilt of the upright. A cut-out section 35 is provided in base plate 12 so that the upright can be tilted forwardly of a vertical plane.

In FIGURE 1 there is illustrated a plurality of spaced openings 36 in opposite sides of the upright. These are registrable with like openings in the sides of slide carriage 22 so that the slide carriage and forks 20 may be secured at various selected elevations in the upright by means of a pair of bolts 38. The tilting movement of the upright about hinge 18 and the range of adjustment of fork height in the upright are arranged to duplicate actual conditions in the exemplary embodiment of my invention under consideration.

A bolt 40 is secured to the platform 12 at the calculated mass center of gravity of an actual lift truck sans load. A load 42 includes a bolt or other securing member 44 located at the mass center of gravity of an assumed load. The load is placed upon forks 20 and a single elastic member 45, such as a rubber band, is attached at its opposite ends to elements 40 and 44. An element 46, illustrated as a washer, is mounted on the rubber band at distances from the mass centers of gravity of the model and load which are inversely proportional to the respective weights which are assumed to be concentrated at said centers of gravity. Inasmuch as the rubber band or equivalent element stretches uniformly the aforesaid distance ratios remain constant irrespective of variations in the degree of forward or reverse tilt of upright 16, or of the height to which load 42 is adjusted in the upright, or of other variable factors which affect stability. Thus, element 46 assumes a position under all conditions which is essentially the location of the combined centers of gravity of a truck and its load.

It will be understood that a relatively small variation in the location of the center of gravity of an unloaded truck will occur upon tilting movement of the upright; i. e., as the upright is tilted rearwardly from a vertical position the center of gravity will move slightly rearwardly, and vice versa. In order to duplicate actual conditions with maximum accuracy it may be deemed desirable to provide for slight movement of bolt 40 along the center line of the truck model so that if the upright 16 is tilted rearwardly, for example, the bolt 40 would be fixed in position slightly rearwardly of its indicated location to compensate for slight change in location of the truck center of gravity. A longitudinal center line slot for such purpose can, for example, be marked in relation to number of degrees of forward and rearward upright tilt, and the bolt 40 fixed in the proper position. I have not illustrated such an arrangement in the drawings inasmuch as it is of no substantial significance from a practical demonstrative viewpoint.

A pointer or indicating rod 48 is preferably hung from the element 46; it will, of course, always hang vertically irrespective of any longitudinal or lateral tilt of the truck model 10. Any variable stability factor, singly or in combination with other such factors, which is varied to cause the indicator 48 to point downwardly to a location on base 12 which lies outside area 26, for example, illustrates an unsafe value of that factor under the given values of the other such factors. This is so for the reason that a dangerous overturning moment force is applied whenever the combined center of gravity lies outside any portion of the stability area 26. In other words, the triangle 26 denotes an area of stability relative to the location of the combined center of gravity for the exemplary truck design under consideration. So long as indicator 48 remains within the boundaries of the triangle 26, a more or less safe static stability conditon is indicated for any existing combination of variable stability factors.

Figure 5:
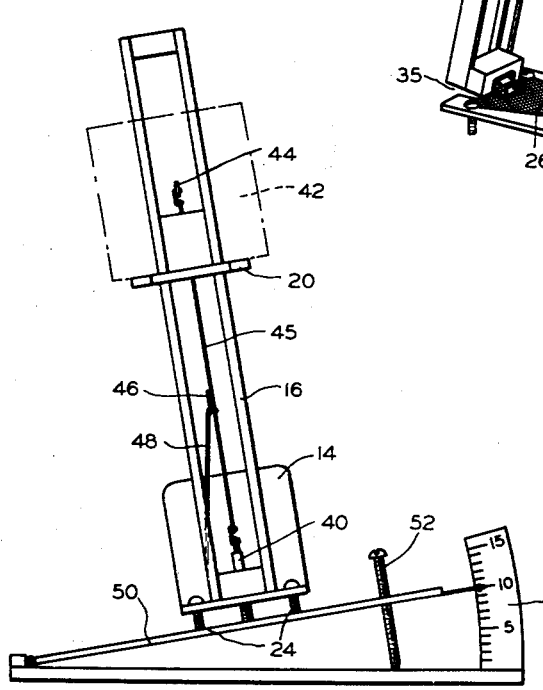
FIGURE 5 illustrates the demonstrator unit mounted upon a tilted platform.

In FIGURE 5 the model is mounted upon a demonstration board 50, the slope of which may be varied as desired by a bolt 52 having an indicator protractor 54 associated therewith for indicating the slope of the board. The model, of course, may be moved to any position on the slope board, whereby the combined centers of gravity may be accurately determined under all possible positions of truck operation. Variations in position of indicator 48 are illustrated under the different conditions of FIGURES 1, 3, 4 and 5.

Although my invention has been described herein with reference to a specific embodiment of a lift truck, numerous modified embodiments will be apparent to persons versed in the art without departing from the inventive concept; the drawings and foregoing description are intended to be illustrative only of the invention. For example, much of the structure of the model 10 may be eliminated without affecting the principal employed. To illlustrate, the supporting studs 24 or equivalents thereof may be eliminated as such, and an area simply outlined on a tiltable board which would accurately denote an area of stable operation of a vehicle or other device. The area, of course, will vary depending upon the construction of the device being investigated, for example, a stability demonstration of a lift truck which utilized four corner supports, as with a non-articulated steer axle, would employ a scaled stability area of rectangular, square or trapezoidal shape, depending upon the relative location of the four wheels. Upright section 16, forks 20, and counterweight portion 14 can be eliminated or altered substantially from the form shown and described herein. For instance, all that is essential in order to demonstrate the principle herein employed relative to lift truck operation is as follows: an anchor element, such as element 40, accurately located within a calculated area of stability at a point which represents the center of gravity of a truck or other article handling device having a given wheel base and weight distribution, for example; a second anchor element, such as element 44, movable vertically and/or arcuately for example, in a selected path which duplicates the movements of a load relative to the area of stability; an elastic member, such as rubber band 45, connecting the two anchor elements; and an indicator element attached to the elastic member in the manner hereinabove described in detail.

Thus, the principle of my invention is demonstrable by simply utilizing, in proper relation one to the other, a defined area, a center of gravity indicator located within the area, a movable center of gravity indicator located within or without the area, an elastic member connecting the indicators, and another indicator properly located on the elastic member. Preferably, however, it is contemplated that in utilizing the invention in practice some type of model be used which is discernible as a lift truck or other device for the reason that the demonstrative effectiveness on observers will be more pronounced.

From the foregoing, it is believed that the novel concept, features and utility of my stability demonstrator will be readily understood.

I claim:

1. In a lift truck model having a base section, a tiltable upright mounted adjacent one end of the base section, a load engaging means movable along the upright and a counterweight portion located adjacent the opposite end of the base section for demonstrating the effect on stability of variable factors which are normally encountered in operation, the combination comprising a plurality of support means secured to and extending beneath the base section, a defined area on the upper surface of the base section connecting the support means, an element secured within said area at a pre-determined mass center of gravity, a load, a second element secured to the load at a pre-determined mass center of gravity, an elastic member adapted to deform uniformly for connecting said first and second elements when the load is located upon the load engaging means, and downwardly depending indicator means suspended from the elastic member at a distance from each of the two elements which is inversely proportional to respective weights which are assumed to be concentrated at the two centers of gravity, said indicator means thereby locating the combined center of gravity of the lift truck model and its load irrespective of changes in variable factors which affect stability.

2. In a lift truck model having a base section, a tiltable upright mounted adjacent one end of the base section and load engaging means movable along the upright for demonstrating the effect on stability of variable factors which are normally encountered in operation of lift trucks, the combination comprising an area marked out on the base section which denotes an area of lift truck stability, first means connected to the base section within said area and so located as to denote the position of mass center of gravity of a lift truck relative to said area, an assumed load adapted to be supported by the load engaging means, second means attached to the load in a position which denotes the mass center of gravity thereof, elastic means connecting said first and second means, and means mounted upon the elastic means at a distance from each of the first and second means which is inversely proportional to the masses represented as being concentrated at the respective centers of gravity, said elastic means being adapted to deform uniformly when the load is placed upon the load engaging means and the load engaging means is moved upwardly in the upright, whereby the said mounted means maintains constant its distance ratio from each of the first and second means and thereby indicates changes in position of the combined center of gravity as the load engaging means is moved upwardly in the upright.

3. A lift truck model having a base section which defines a stability area of lift truck operation, means extending upwardly from one end of the base section and mounted to pivot longitudinally thereof, means movable upwardly and downwardly relative to said upwardly extending means, means located at assumed mass centers of gravity within said defined area and said movable means, respectively, elastic means adapted to deform uniformly connecting said latter means, and means connected to the elastic means so as to indicate the location of the combined mass centers of gravity of said locating means, said latter means moving with the elastic means to new positions of combined centers of gravity as the movable means is moved to various positions of elevation along the upwardly extending means and the upwardly extending means is tilted relative to the base.

4. A stability demonstrator comprising a tiltable base which defines a stability area for vehicles of the type described, an element secured to the base member within said area at a position which represents the mass center of gravity of such vehicle, means extending upwardly relative to one end of the base member, a second element connected to the upwardly extending means and located at the mass center of gravity of an assumed load to be carried by such a vehicle, an elastic member adapted to deform uniformly interconnecting the first and second elements, an indicator means located on the elastic member at a position which indicates the location of the combined mass center of gravity designated by the first and second elements, said indicator means being adapted to indicate an unstable condition as it moves outside of the said defined area during tilting of the platform.

5. A lift truck model having a base section which defines a stability area of lift truck operation, upright means located at one end of the base section, means movable to selected elevations on the upright means, first and second means located at assumed mass centers of gravity within said defined area and said movable means, respectively, uniformly elastic means connecting said first and second means, and indicator means suspended from the elastic means at a predetermined location such that the indicator means indicates the location of the combined center of gravity of the assumed masses, said indicator means moving with the elastic means to indicate changes in the location of the combined center of gravity relative to said stability area as the movable means is moved to various positions of elevation in the upright means.

6. In a stability demonstrator, a first element locating a center of gravity of a first assumed mass, a second element locating a second center of gravity of a second assumed mass, a rigid body interconnecting the assumed masses, means mounting said second assumed mass on the rigid body for movement in a preselected path, an elastic member adapted to deform uniformly connecting the first and second elements, and an indicator element suspended freely from the elastic member at a distance from each of the first and second elements which is inversely proportional to the magnitude of the assumed masses.

7. A demonstrator as claimed in claim 6 wherein an area is defined in which the first element is located and which represents stability boundaries of an article handling or other device, said indicator element moving to various locations within and without said area during movements of the second element relative to the first element, such movements of said indicator element indicating conditions of relative stability of the device.

8. A method of demonstrating stability of an article handling device comprising the steps of locating a first element in a position which represents a mass center of gravity of an unloaded device, locating a second element in a position which represents a mass center of gravity of an article which is movable relative to the first element in a preselected path, connecting a uniformly elastic member to the first and second elements, connecting an indicator element to the elastic member at a distance from each of the first and second elements which is inversely proportional to the masses which are assumed to be concentrated at the locations of said first and second elements, and moving said second element in said preselected path thereby causing said elastic member to change its length and said indicator element to move so that for any position of said second element in said preselected path the path the indicator element indicates the combined center of gravity of an article handling device and article.

9. A method as claimed in claim 8 plus the step of outlining a predetermined area around the first element, movement of said indicator element within said area representing a relatively stable condition of operation of an article handling device and movement of the indicator element without said area representing a relatively unstable condition of operation of said device.

References Cited in the file of this patent
UNITED STATES PATENTS

| 2,346,066 | Conrad | Apr. 4, 1944 |
| 2,418,593 | Martin | Apr. 8, 1947 |
| 2,767,394 | Arnot | Oct. 16, 1956 |
| 2,858,070 | Scharff | Oct. 28, 1958 |